Sept. 21, 1948.  C. K. STILLWAGON  2,449,795
PIPE COUPLING
Filed Feb. 14, 1944
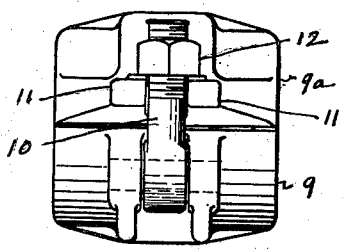
Fig. 1.
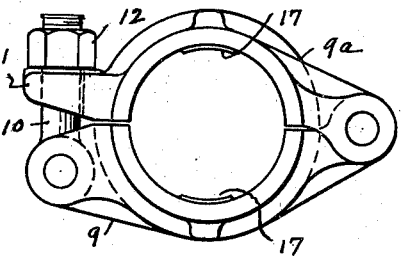
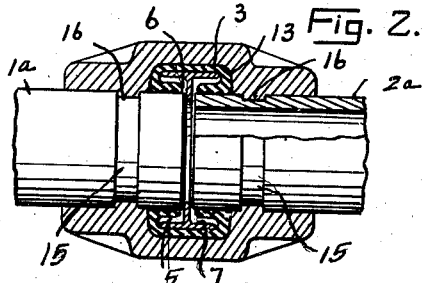
Fig. 2.
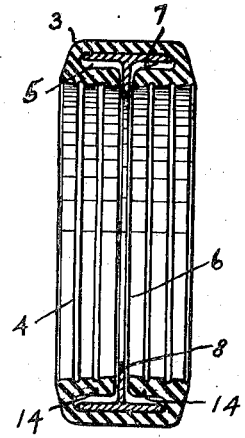
Fig. 3.
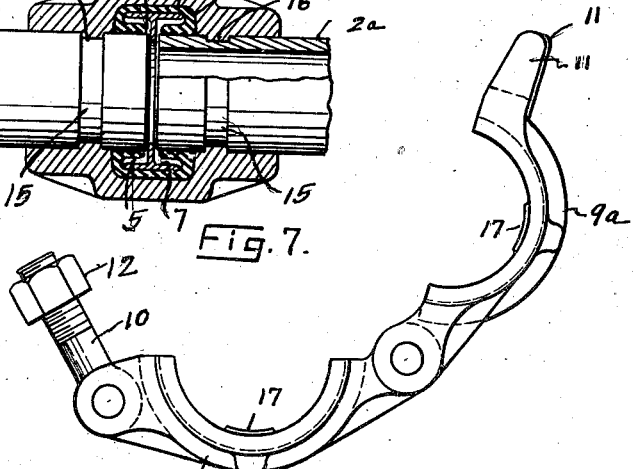
Fig. 7.
Fig. 4.
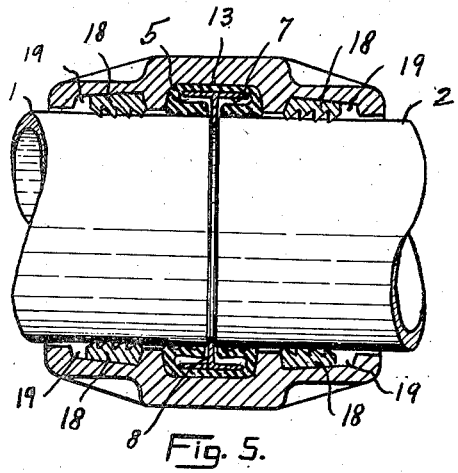
Fig. 5.
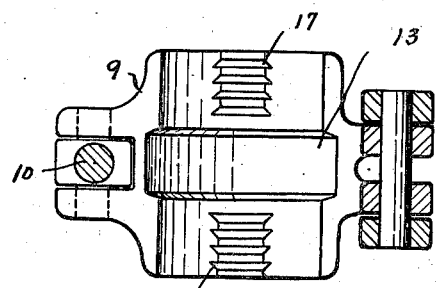
Fig. 6.
INVENTOR.
Crawford K. Stillwagon
BY
E. V. Hardway,
ATTORNEY Patented Sept. 21, 1948

2,449,795

UNITED STATES PATENT OFFICE 2,449,795

PIPE COUPLING

Crawford K. Stillwagon, Houston, Tex., assignor to Well Equipment Mfg. Corp., Houston, Tex., a corporation of Texas Application February 14, 1944, Serial No. 522,331

1 Claim. (Cl. 285—194)

This invention relates to a pipe coupling which is composed essentially of a sectional hinged clamp, a pressure seal gasket therein and an annular centering stop in the gasket.

An object of the invention is to provide a coupling for quickly connecting and disconnecting the ends of pipes, rods or cylindrical objects and which embodies means for securely gripping the pipe.

Another object of the invention is to provide, in a coupling a centering stop to insure the centering of the coupling about the adjacent ends of the pipe coupled together.

The coupling has been especially designed for making temporary pipe connections although it is suitable for general and permanent use.

With the above and other objects in view the invention has particular relation to certain novel features of construction, arrangements of parts and use an example of which is given in this specification and illustrated in the accompanying drawings, wherein—

Figure 1 shows the side view of the coupling assembled.

Figure 2 shows an end view.

Figure 3 shows a longitudinal sectional view of the gasket and centering stop.

Figure 4 shows an end view of the coupling in open position.

Figure 5 shows a longitudinal view of the coupling applied to the pipe and embodying one type of gripping means.

Figure 6 shows an inside view of one of the coupling members, showing the coupling partly in section with another type of gripping means.

Figure 7 shows a longitudinal sectional view of another embodiment of the coupling applied to the pipe.

Referring now more particularly to the drawings wherein like numerals of reference designate the same parts in each figure, the numerals 1 and 2 designate aligned pipe sections having plain ends to be coupled together and numerals 1a and 2a designate aligned pipe sections having grooved ends to be coupled together.

The numeral 3 designates a sealring, or gasket, whose inner side may be provided with annular grooves 4. This gasket has an inside annular cavity 5 and is provided with an inside annular slit 6 extending inwardly from said cavity through the inside wall of the gasket.

Within said cavity there is an annular band or ring 7 formed of metal or other rigid material and which has an inside flange 8 which extends inwardly through said slit beyond the gasket.

The numerals 9, 9a designate the sections of the clamp which are hinged together at one end and whose other ends are provided, one with a clamp bolt 10, pivoted thereto and the other with spaced lugs 11, 11 between which the bolt 10 may be fitted, as shown in Figures 1 and 2 and the free end of the bolt is threaded to receive the clamp nut 12 which may be screwed up against the lugs to secure the clamp closely around said adjacent ends of the pipe sections. The clamp has an annular inside groove 13 shaped to conform to the external contour of, and to receive the sealring 3. The centering flange, or stop 8 fits between the adjacent ends of the pipe sections to insure the centering of the clamp about the adjacent ends of the pipe sections coupled together.

It will be observed that the sealring 7, above described, has the inside lips 14, 14 and the pressure of the fluid flowing through the pipe line will enter the cavity 5 and will hold these lips in sealing relation with the pipe surrounded by them.

As illustrated in Figure 7 the adjacent ends of the pipe sections are provided with external annular grooves 15, 15 and the clamp sections, of this form have the internal annular ribs 16, 16 to engage in said grooves to positively secure the pipe sections against separation.

In the form illustrated in Figures 2 and 6 the clamp sections have the series of inside teeth 17 to engage with the plain ends of adjacent pipe sections to secure said sections against separation.

In the embodiment illustrated in Figure 5 there are the wedge shaped slips 18, 18 located within the ends of the clamp sections to engage the ends of plain pipe sections to prevent their separation from the coupling. These slips are internally toothed, as shown, and their outer sides are tapered outwardly. They are seated in the inside recesses 19, 19 whose outer sides converge outwardly to conform to the external taper of said slips so as to cause the slips to grip the pipe more securely upon outward movement of the pipe sections.

This type of coupling may be readily applied to and removed from the pipe and when installed thereon will not only secure the sections together but will form a leak tight joint.

In installing the coupling, the seal ring 3, is inserted over the end of one pipe section until said end contacts the flange or stop 8 and the adjacent end of the other pipe section is then inserted into the seal ring until it contacts said stop. The sections 9, 9a of the clamp are then closed about the adjacent pipe ends with the seal ring fitting into groove 13 and said clamp sections are then latched together and the installation thus completed.

What I claim is:

A pipe coupling formed of clamp members hinged together at one side, releasable means for securing said members together around adjacent pipe ends at the other side, inside teeth at the ends of each member for engaging the respective pipe ends, an annular seal ring adapted to surround the adjacent ends of the pipe sections within the coupling and sealing the joint between said adjacent ends, said seal ring being formed of resilient material and having an inside, annular cavity provided with an inside annular slit extending inwardly from the cavity through the wall of the gasket, an annular band formed of rigid material within, and extending entirely around said cavity and provided with an annular inside radial flange which extends inwardly through the slit beyond the inside of the gasket to form a yieldable stop.

CRAWFORD K. STILLWAGON.

REFERENCES CITED

The following references are of record in the file of this patent:

UNITED STATES PATENTS

| Number | Name | Date |
|---|---|---|
| 1,541,601 | Tribe | June 9, 1925 |
| 1,704,003 | Johnson | Mar. 5, 1929 |
| 1,819,654 | Metcalf | Aug. 18, 1931 |
| 1,930,194 | Dillon | Oct. 10, 1933 |
| 2,020,554 | Johnson | Nov. 12, 1935 |

FOREIGN PATENTS

| Number | Country | Date |
|---|---|---|
| 319,582 | Great Britain | Sept. 26, 1929 |
| 410,721 | Great Britain | May 24, 1934 |
| 458,441 | Great Britain | Dec. 21, 1936 |
| 464,300 | Great Britain | Apr. 15, 1937 |